United States Patent [19]

Mori

[11] Patent Number: 4,612,605
[45] Date of Patent: Sep. 16, 1986

[54] LIGHT SOURCE DEVICE

[76] Inventor: Kei Mori, 3-16-3-501, Kaminoge, Setagaya-ku, Tokyo, Japan

[21] Appl. No.: 690,237

[22] Filed: Jan. 10, 1985

[30] Foreign Application Priority Data

Jan. 31, 1984 [JP] Japan .................................. 59-16276

[51] Int. Cl.[4] ........................... F21V 8/00; G02B 6/00
[52] U.S. Cl. ...................................... 362/32; 362/320; 362/386; 350/265; 350/96.21
[58] Field of Search ................. 362/32, 154, 228, 372, 362/386, 35, 96, 287, 320; 250/236, 227; 350/90.21, 265

[56] References Cited

U.S. PATENT DOCUMENTS

| Re. 31,678 | 9/1984 | Ochiai | 350/96.27 X |
| 3,644,725 | 2/1972 | Lochridge, Jr. | 362/32 |
| 4,123,172 | 10/1978 | French | 362/32 X |
| 4,525,031 | 6/1985 | Mori | 362/32 X |

FOREIGN PATENT DOCUMENTS

| 0071052 | 2/1983 | European Pat. Off. | 362/32 |
| 0609022 | 5/1978 | U.S.S.R. | 362/33 |
| 0761783 | 9/1980 | U.S.S.R. | 362/32 |

Primary Examiner—Willis R. Wolfe, Jr.
Attorney, Agent, or Firm—Jordan and Hamburg

[57] ABSTRACT

A light source device which employs light energy transmitted through an optical conductor cable as a photosynthesizing light source for cultivating plants. The light energy emitted from the optical conductor cable is effectively dispersed in order to nurture plants. The light source device is comprised of one or more optical conductor cables, a first base plate having one or more holes for inserting the optical conductor cables, a second base plate mounted adjacent to the first base plate on the lower side thereof and having one or more holes for inserting the tip end portions of the optical conductor cables passing through the holes of the first base plate, and a motor mounted on the first or second base plate for rotating it.

15 Claims, 7 Drawing Figures

FIG.1
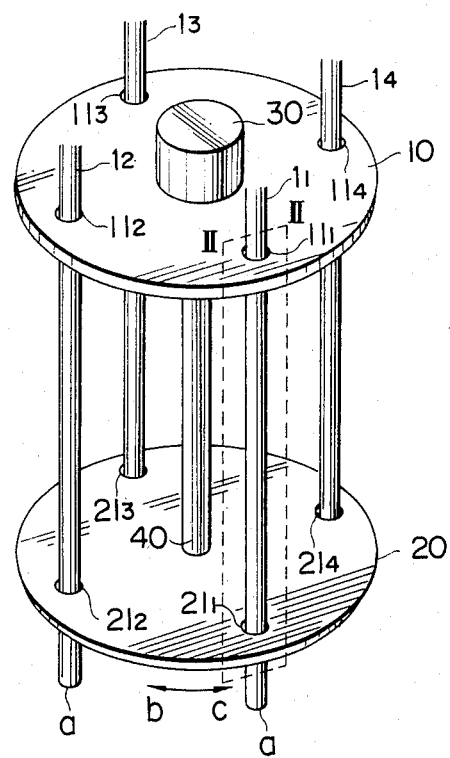
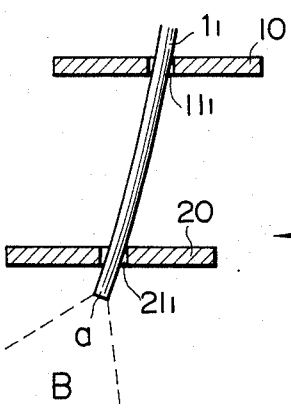
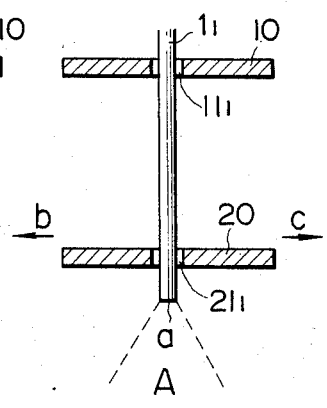
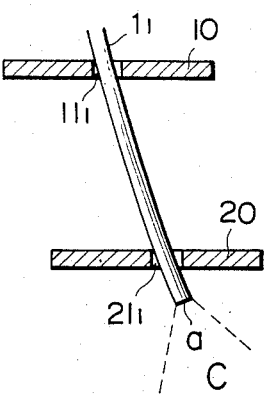
FIG.2b   FIG.2a   FIG.2c

LIGHT SOURCE DEVICE

BACKGROUND OF THE INVENTION

The present invention relates to a light source device, specifically a light source device in which, in the case of employing light energy transmitted through an optical conductor cable as a photo-synthesizing light source for cultivating plants, the light energy emitted from the optical conductor cable is effectively dispersed in order to nurture plants.

A proper amount of nutrients and proper atmospheric condition such as light, carbon-dioxide, water, termperature, humidity, etc. are needed for effectively nurturing plants. However, it is often difficult to obtain all of them at once. In order to nurture plants, a suitable ground is needed. In urban districts, as in a megalopolis, it is not so easy to acquire a space for cultivation. It is especially difficult to secure an area that is exposed to the sun.

In order to solve such problems, the present applicant has previously proposed devices to focus the sun's rays by means of a lense or the like and to guide them into an optical conductor, and further to guide the solar rays through the optical conductor to a plant cultivating device to be installed at an optional desired place so as to supply solar ray energy to plants. The present applicant further proposed another plant cultivating device in which artificial light rays were added to the solar rays collected in such a manner as described above. (For instance, refer to the Japanese Patent Application No. 58-119866.)

Utilizing the light energy collected, plants perform photo-synthesis. The nutritious substances produced by the process of photo-synthesis are then transferred to the trunk and fruit of the plants. Such transfer can be effectively realized when there are no light rays available, much oxygen, or low temperatures. Namely, it is necessary to perform the photo-synthesizing reaction and transfer the nutritious substance produced by the photo-synthesizing for the purpose of nurturing the plants. In order for plants to perform photo-synthesis and to transfer nutritious substances to their trunks and fruit, the brightness period (the period of photo-synthesis) and the darkness period (the transfer period) are preferably repeated at predetermined time intervals.

Furthermore, in the case of nurturing plants, if the light rays are supplied to the plants intermittently (several $\mu s$ to several ms) instead of successively, in other words, the photo-synthesis process consists of a brightness reaction and a darkness reaction and the intensive light rays are supplied to the plants only during the brightness reaction period while the light rays are not supplied or rather weak light rays are supplied to the plants during the darkness reaction period. Thereby growth of plants is promoted as a matter of course.

When the light source device is moved so as to disperse the light rays, the utilization area of the light energy can be enlarged considerably when compared with the illumination of plants by use of a fixed light source. Specifically in the case of employing a light source of the same capacity, the plants can be cultivated over a wider range. Furthermore, in accordance with the movement of the light source device, the shadowed portion of the front leaves changes every moments, and therefore the brightness reaction and the darkness reaction are repeated effectively so that the growth of the plants can be promoted more effectively.

SUMMARY OF THE INVENTION

It is an object of the present invention to provide a light source device which employs light energy transmitted through an optical conductor cable as a photo-synthesizing light source for cultivating plants, the light energy emitted from the optical conductor cable is effectively dispersed in order to nurture plants.

Another object of the present invention is to provide a light source device in which the light rays transmitted through the optical conductor are effectively dispersed and supplied to plants so that plants can be more effectively cultivated over a wider area.

It is another object of the present invention to provide a light source device in which the light rays emitted from the edge surface of the optical conductor can be effectively dispersed and supplied to the plants.

BRIEF DESCRIPTION OF THE DRAWINGS

FIG. 1 is a perspective view for explaining an embodiment of the present invention;

FIGS. 2(a), 2(b) and 2(c) are a partially enlarged views of the main portion for explaining the operation of the present invention; and FIG.'s 3 through 5 are perspective views for explaining other embodiments of the present invention.

DESCRIPTION OF THE PREFERRED EMBODIMENTS

Figure 3:
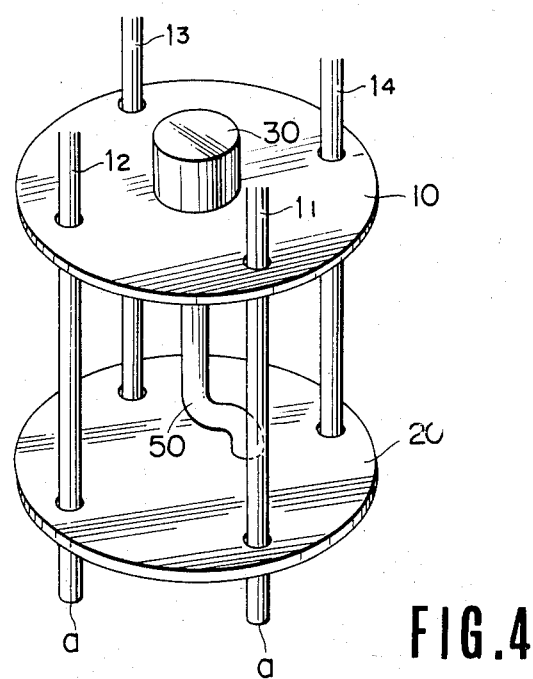

FIG. 1 is a perspective construction view for explaining an embodiment of the light source device according to the present invention. In FIG. $1_1$, $1_2$, . . . , $1_4$ are optical conductors through which light energy is transmitted, 10 is a first base plate having a large number of holes $11_1$, $11_2$, . . . , $11_4$ through which the optical conductors $1_1$, $1_2$, . . . , $1_4$ are inserted respectively, 20 is a second base plate having a large number of holes $21_1$, $21_2$, . . . , $21_4$ through which the tip end portions of the optical conductors $1_1$, $1_2$, . . . , $1_4$ are inserted respectively, 30 is a motor for rotating reciprocatedly the second base plate 20, and 40 is a shaft for transmitting the rotation of the motor 30 to the second base plate 20.

Another tip end portions of the optical conductors $1_1$, $1_2$, . . . , $1_4$ (not shown in FIG. 1) are positioned respectively at the focal point of the lense for focusing solar rays or artificial light rays. The solar rays or the artificial light rays focused by each lense are guided into the respective optical conductors $1_1$, $1_2$, . . . , $1_4$ and further transmitted therethrough to the optional desired place.

In such a manner, the light rays transmitted through each optical conductor are emitted from the edge surface a of the respective optical conductors $1_1$, $1_2$, . . . , $1_4$, and utilized as the light source for cultivating plants such as tomatoes, lettuce, etc. However, in the case of employing a light source in the same capacity, plants can be cultivated over a wider range by moving the light source as compared with not letting the light source more and thereby furthering the growth of plants.

For this reason, in the present invention, the second base plate 20 is rotated in the direction of arrow b and arrow c so as to change the direction of the output edge surface of the optical conductors $1_1$, $1_2$, . . . , $1_4$, and thereby moving the light rays and widening the area to be illuminated.

FIGS. 2(a), 2(b) and 2(c) are views for explaining the state of change in the light emitting direction of the light rays from the optical conductors $1_1, 1_2, \ldots, 1_4$ at the time when the second base plate 20 is rotated. In FIG. 2, the cross-sectional view taken along line II—II of FIG. 1 is shown, being represented by the optical conductor $1_1$. With respect to $1_2$ through $1_4$, the state of change in the light emitting direction is quite the same.

In FIGS. 2(a), 2(b) and 2(c) if the second base plate 20 is rotated in the direction of arrow b, starting from the state shown in FIG. 2(a), i.e. the state in which the direction of the light rays emitted from the optical conductor $1_1$ is A, and the plate 20 turns out to be in the state shown in FIG. 2(b), the direction of the light-emitting edge surface of the optical conductor $1_1$ changes and the direction of the light emission from the optical conductor $1_1$ becomes B. On the contrary, if the second base plate 20 is rotated in the direction of arrow c and turns out to be in the state as shown in FIG. 2(c), the direction of the light emission from the optical conductor $1_1$ becomes C.

In such a manner, according to the present invention, the light-emitting edge surface of the optical conductor is moved and the direction thereof is changed so as to move the light rays emitted from the light-emitting edge surface of the above-mentioned optical conductor. If the light rays are moved in such a manner, even the portion which is always in the shadows can be instantly supplied with light rays. Consequently, the photosynthesis process can be effectively performed at this portion. Furthermore, it may be possible to promote the nurturing of plants to a larger extent and to supply light rays over a wider range.

The rotating of the second base plate 20 has been described heretofore. If an eccentric movement is employed which is parallel to the second base plate, the direction of the light rays, emitted from the light-emitting edge surface of the optical conductor, will further change in various ways, and furthermore the light rays will be effectively supplied to the plants and the area for supplying the light rays will be expanded.

An embodiment of rotating the second base plate has been described heretofore. However, it may also be possible to rotate the first base plate instead of the second base plate. Furthermore, it may be also possible that an electric lamp like a fluorescent lamp, can be mounted on the lower side of the first base plate, and in addition, the second base plate is constructed with a transparent material, and the light rays from the aforementioned electric lamp and the light rays from the optical conductor, as mentioned above, are supplied to the plants simultaneously.

FIG. 3 is a perspective view for explaining another embodiment of the present invention. In FIG. 3, the same reference numeral as that of FIG.'s 1 and 2 is attached to the portion performing the same operation as that of FIG.'s 1 and 2. In the embodiment, the rotation of the motor 30 is transmitted to the second base plate through the crank shaft 50. On that occasion, the crank shaft 50 and the second base plate 20 are mutually in a state of free rotation.

Therefore, according to the above-mentioned embodiment, when the motor 30 rotates the second base plate performs an eccentric movement back-and-forth and right-and-left. However, the second base plate 20 itself doesn't rotate at all. In accordance with the movement thereof, the direction of each light-emitting edge surface of the respective optical conductors $1_1, 1_2, \ldots, 1_4$ changes, and as is the case of the first embodiment the direction of the light rays emitted from the respective optical conductors also changes in order.

Figure 4:
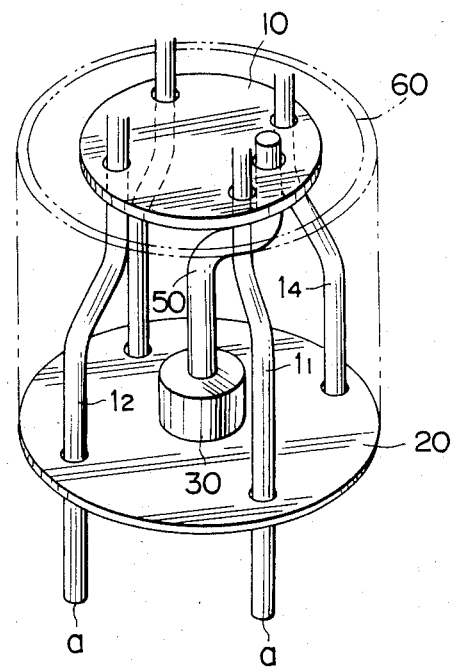

FIG. 4 is a perspective construction view for explaining still another embodiment of the present invention. In FIG. 4, the first base plate 10 is rotated instead of the second base plate 20. On that occasion, the crank shaft 50 and the first base plate 10 are mutually in a state of free rotation. In such a manner, when the light source device is viewed from the lower side thereof, and second base plate 20 is fixed thereon and each light-emitting tip end of the respective optical conductors performs a goose-neck movement.

According to this embodiment, a cover 60 fixed on the second base plate covers the space between the first base plate 10 and the second base plate 20 as shown by the two-dots-and-dash line in FIG. 4. In such a manner, when the light source device is viewed from the lower side thereof, the first base plate 10 performing an eccentric movement, the optical conductors between the first base plate 10 and the second base plate 20, the motor, etc. are invisible therefrom. Consequently, the light source device can be constructed in a streamlined, attractive way.

Moreover, an embodiment of a light source device constructed, by use of four optical conductors, has been described heretofore. However, the present invention is not limited to the afore-mentioned embodiments. Furthermore the number of optical conductors is not limited to four. It may be easily understood that the number of conductors is allowed to be one or more.

Figure 5:
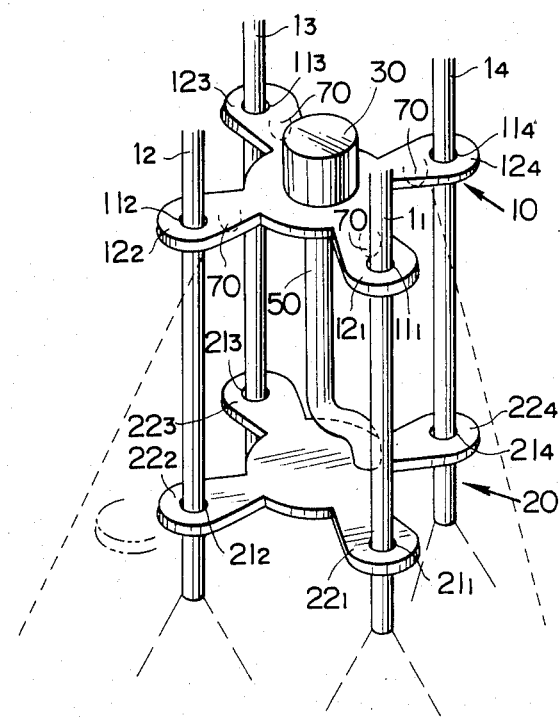

In the examples as shown in the drawings illustrated heretofore, the base plates 10 and 20 are shown in the shape of a circular board. However, in the present invention, the above-mentioned base plates 10 and 20 are not limited to the circular board. Those plates can be formed in an optional shape. And furthermore, as shown in FIG. 5, both of the base plates or either one of those plates are constructed with the plate members $12_1-12_4$, $22_1-22_4$ which are radially elongated. In addition, it may be possible that holes $11_1-11_4$ and $21_1-21_4$ used for inserting the optical conductor cables $1_1-1_4$ are bored in the respective plate members.

Furthermore, it has been previously mentioned that the electric lamp can be mounted also on the lower side of the first base plate 10. In FIG. 5, 70 is an electric lamp mounted on the lower side of the first base plate 10. In the case of mounting the electric lamp on the lower side of the first base plate 10 in such a manner, the second base plate 20 is constructed with a transparent material so that the light rays emitted from the electric lamp can be transmitted through the transparent base plate 20 onto the plants located at a lower place. On that occasion, one or more electric lamps 70 are mounted thereon without disturbing the rotation of the shaft 40 or 50 and the movement of the optical conductor cables $1_1-1_4$. Then if the area to be illuminated by the electric lamp 70 is approximately equal to the area to be illuminated by the movement of the tip end portion of the respective optical conductor cables $1_1-1_4$, the light rays corresponding to the indirect solar rays can be supplied to the plants from the electric lamp 70, and light rays corresponding to direct solar rays can be supplied thereto from the respective optical conductor cables $1_1-1_4$.

Furthermore it may be possible that the light rays illuminate a wider area by moving the entire portion of the light source device when constructed as described above. In such a case the light source device in which no electric lamp is mounted on the base plate thereof, the first base plate 10, the second base plate 20 and the cover 60 are constructed with a transparent material, and an electric lamp like a fluorescent lamp is fixedly mounted on the ceiling. In such a construction, the light rays from the electric lamp illuminate the plants located at a lower place through the base plates of the construction through the cover, etc. Consequently, as is the case for mounting the electric lamp on the afore-mentioned base plate, the electric lamp mounted on the ceiling can supply light rays corresponding to indirect solar rays to the plants located at a lower place, and the optical conductor cables can supply thereto light rays corresponding to direct solar rays.

As is apparent from the foregoing description, according to the present invention, the light rays emitted from the edge surface of the optical conductor can be effectively dispersed and supplied to the plants so that the growth of the plants can be effectively promoted, and further the light rays can be supplied over a wider range.

What is claimed is:

1. A light source device comprising optical conductor means through which light energy is transmitted, a first base plate, first hole means in said first base plate, said optical conductor means passing through said first hole means, a second base mounted adjacent to said first base plate, said second base plate having second hole means, said optical conductor means passing through said second hole means, said second base plate having a first and a second side, said first side facing said first base plate, said conductor means having end tip portions for emitting light which has been conducted by said conductor cable, said end tip portions extending from said second side of said second base plate, and motor means mounted on one of said base plates for effecting relative rotation between said first and second base plates.

2. A light source device according to claim 1 wherein said first and second base plates are each circular and have the same diameter.

3. A light source device according to claim 1 wherein said motor means is operably connected between said first and second base plates to effect concentric relative rotation between said first and second base plates about a common axis.

4. A light source device according to claim 1 wherein said first base plate is constructed of transparent material.

5. A light source device according to claim 1 wherein said second base plate is constructed of a transparent material.

6. A light source device according to claim 1 wherein said first and second base plates are constructed of a transparent material.

7. A light source device according to claim 1 wherein said first base plate is spaced from said second base plate, and further comprising electric lamp means mounted on said first base plate and disposed between said first and second base plates.

8. A light source device according to claim 1 wherein said conductor means comprises a plurality of optical conductors, said first hole means comprising a plurality of first spaced holes in said first base plate disposed in a first circle, said second hole means comprising a plurality of second spaced holes in said second base plate disposed in a second circle.

9. A light source device according to claim 8 wherein said first and second circles have the same diameter.

10. A light source device according to claim 1 wherein each of said first and second base plates has a central portion and extending portions extending from said central portion, said first and second hole means each comprising holes in said extending portions.

11. A light source device according to claim 10 wherein said extending portions extend generally radially from said central portion.

12. A light source device according to claim 1 wherein said motor means is operably connected between said first and second base plates to effect eccentric relative rotation between said first and second base plates about two spaced axes.

13. A light source device according to claim 12 wherein said motor means comprises a motor and a crank arm driven by said motor, said motor being mounted on one of said base plates, said crank arm being rotatably connected to the other of said base plates.

14. A light source device according to claim 1 wherein said second base plate is spaced from said first base plate, and a cover means fixed to one of said base plates and extending over said space between said first and second base plates.

15. A light source device according to claim 14 wherein said cover is constructed of a transparent material.

* * * * *